(12) United States Patent
Nishijima

(10) Patent No.: US 6,802,383 B2
(45) Date of Patent: Oct. 12, 2004

(54) SNOWMOBILE EXHAUST SYSTEM

(75) Inventor: Shinichi Nishijima, Shizuoka (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/014,062

(22) Filed: Dec. 10, 2001

(65) Prior Publication Data
US 2002/0112909 A1 Aug. 22, 2002

(30) Foreign Application Priority Data
Dec. 8, 2000 (JP) ........................................ 2000-374894

(51) Int. Cl.[7] .............................................. B62M 29/00
(52) U.S. Cl. .................... 180/190; 180/68.3; 180/309; 180/89.2; 123/65 PE; 60/313
(58) Field of Search ..................... 180/182, 184–186, 180/190, 9.21, 9.1, 9, 9.25, 309, 68.3, 192, 89.2, 193; 123/65 PE; 60/313, 314, 321

(56) References Cited

U.S. PATENT DOCUMENTS 3,779,327 A * 12/1973 Pereault ..................... 180/190
4,046,219 A    9/1977 Shaikh
4,186,819 A    2/1980 Nowak et al.
4,418,782 A * 12/1983 Nakazima ................... 180/190
4,917,207 A *  4/1990 Yasui et al. ................. 180/193
5,862,662 A    1/1999 Fukuda et al.
5,957,230 A    9/1999 Harano et al.
6,109,217 A    8/2000 Hedlund et al.
6,134,885 A   10/2000 Gilbertson
6,155,374 A   12/2000 Uchida
6,167,700 B1   1/2001 Lampert
6,227,323 B1   5/2001 Ashida
6,237,566 B1   5/2001 Spaulding
6,263,991 B1 *  7/2001 Savage et al. .............. 180/190

* cited by examiner

Primary Examiner—Lesley D. Morris
Assistant Examiner—Matthew Luby
(74) Attorney, Agent, or Firm—Knobbe Martens Olson & Bear LLP

(57) ABSTRACT

A snowmobile has a frame construction that defines a recess above a drive unit. The recess is formed by a horizontal member and a pair of vertical members. A portion of the exhaust system extends within the recess at a location above the drive unit.

41 Claims, 15 Drawing Sheets

SNOWMOBILE EXHAUST SYSTEM

RELATED APPLICATIONS

This application is based upon and claims the priority of Japanese Patent Application No. 2000-374894, filed on Dec. 8, 2000, which is hereby incorporated by reference in its entirety.

BACKGROUND OF THE INVENTION

1. Field of the Invention

The present invention generally relates to exhaust systems for land vehicles. More specifically, the present invention relates to an improved exhaust system layout for snowmobiles that results in improved cooling of the exhaust system.

2. Description of the Related Art

Snowmobiles are powered by internal combustion engines that are mounted within a substantially enclosed engine compartment. The engine compartment typically is defined within a portion of a body panel such that direct airflow through the engine compartment is inhibited.

An exhaust system mounts to the engine for routing exhaust byproducts from the engine to the atmosphere. Generally, the exhaust system mounts to a forward facing portion of the engine and extends forward before wrapping around one side of the engine. In this manner, the exhaust system is mainly disposed forward and to one side of the engine.

Due to the restricted air flow within the engine compartment, the amount of cooling provided by the air is greatly reduced. Thus, the temperature of the exhaust system components tends to be very high. This increased temperature of the exhaust system also results in increased engine temperature and increased air temperature within the engine compartment. For many reasons, such high temperatures are not desired.

SUMMARY OF THE INVENTION

Thus, an exhaust system that can reduce the amount of heating within the engine compartment is desired. Additionally, the exhaust system preferably is simply constructed and admits of a rather simple cooling arrangement.

Accordingly, one aspect of the present invention involves a snowmobile comprising a frame assembly comprising an inverted generally U-shaped portion. An engine is mounted to the frame assembly. A drive belt is powered by the engine and disposed at least partially within the inverted generally U-shaped portion. An exhaust system is connected to the engine and extends rearward of the engine in a region defined between a bight of the inverted generally U-shaped portion and the drive belt.

Another aspect of the present invention involves a snowmobile comprising a frame assembly. The frame assembly comprises a front portion and a rear portion that are joined together. The rear portion comprises three walls that combine to form an inverted U-shaped member. The front portion defines an engine compartment with an engine being disposed within the engine compartment. The engine powers a drive track that extends below at least a portion of the inverted U-shaped member. An exhaust system is coupled to the engine and defines a discharge path for exhaust gases generated in the engine. The exhaust system comprises an exhaust conduit that extends between an inner surface of the inverted U-shaped member and the drive track.

BRIEF DESCRIPTION OF THE DRAWINGS

These and other features, aspects and advantages of the present invention will be better understood with reference a preferred embodiment, which is illustrated in the accompanying drawings. The illustrated embodiment is merely exemplary and is not intended to define the outer limits of the scope of the present invention. The drawings of the illustrated arrangement comprise fifteen figures.

DETAILED DESCRIPTION OF THE PREFERRED EMBODIMENT

Figure 1:
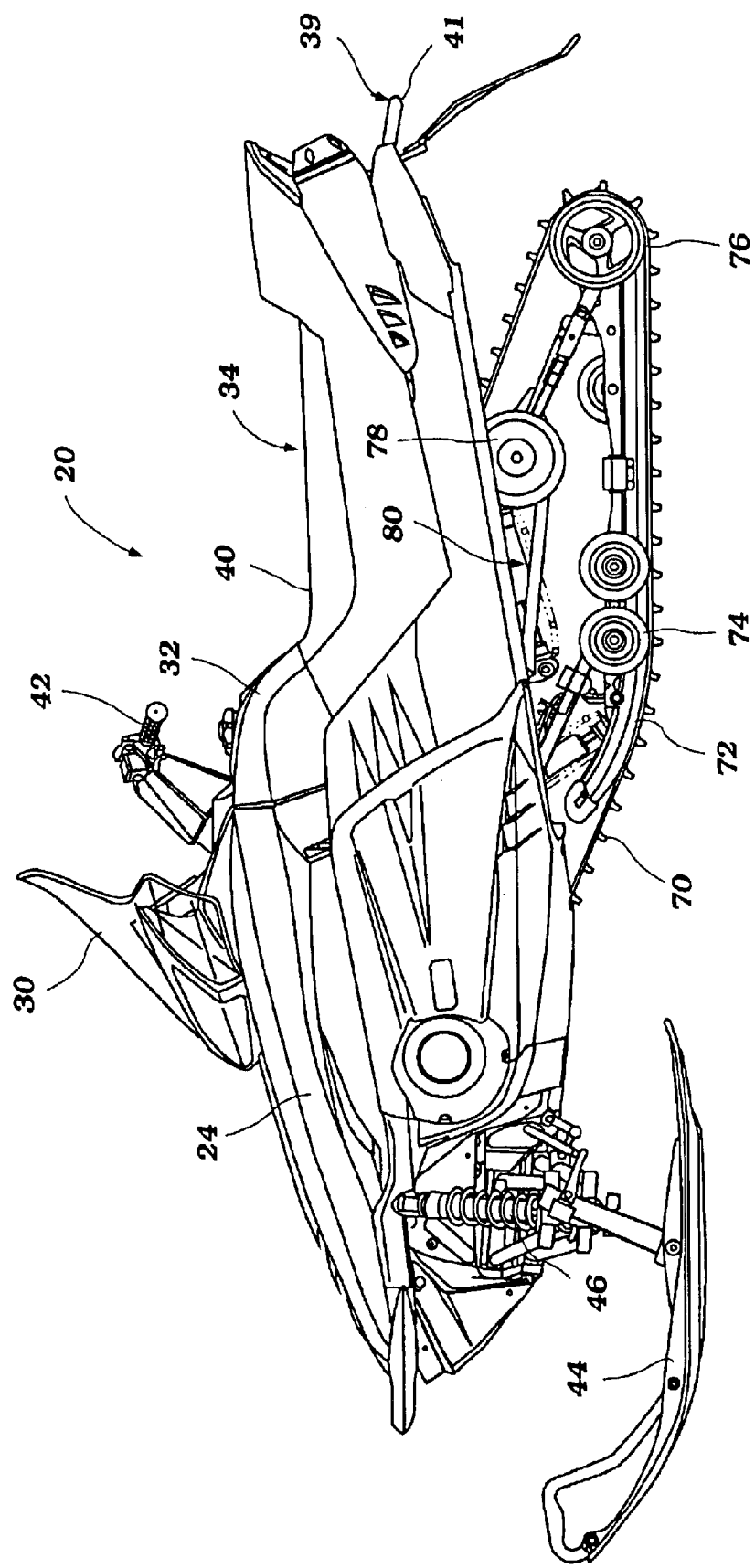
FIG. 1 is a side elevation view of a snowmobile having a frame assembly arranged and configured in accordance with certain features, aspects and advantages of the present invention.
Figure 2:
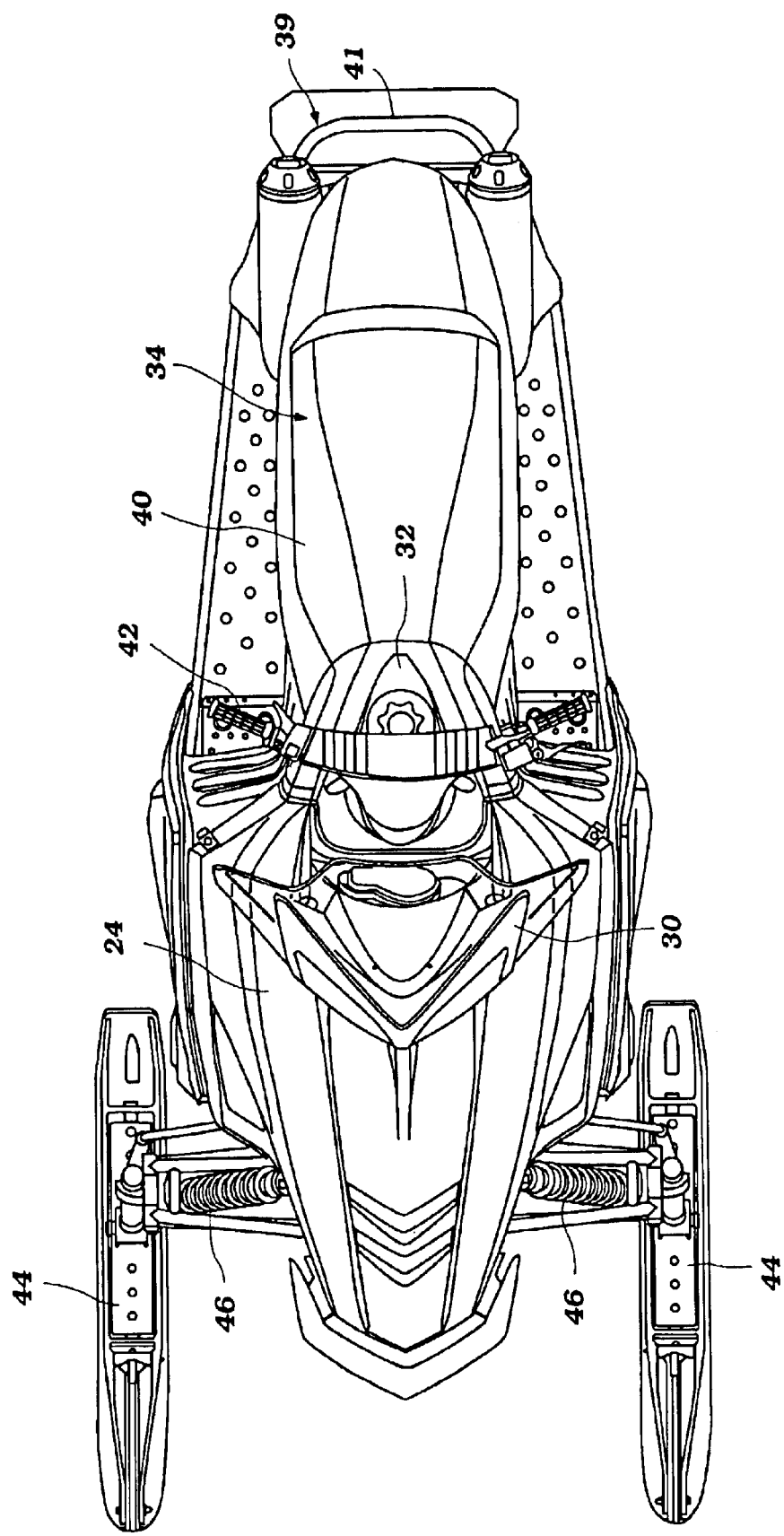
FIG. 2 is a top plan view of the snowmobile of FIG. 1.
Figure 3:
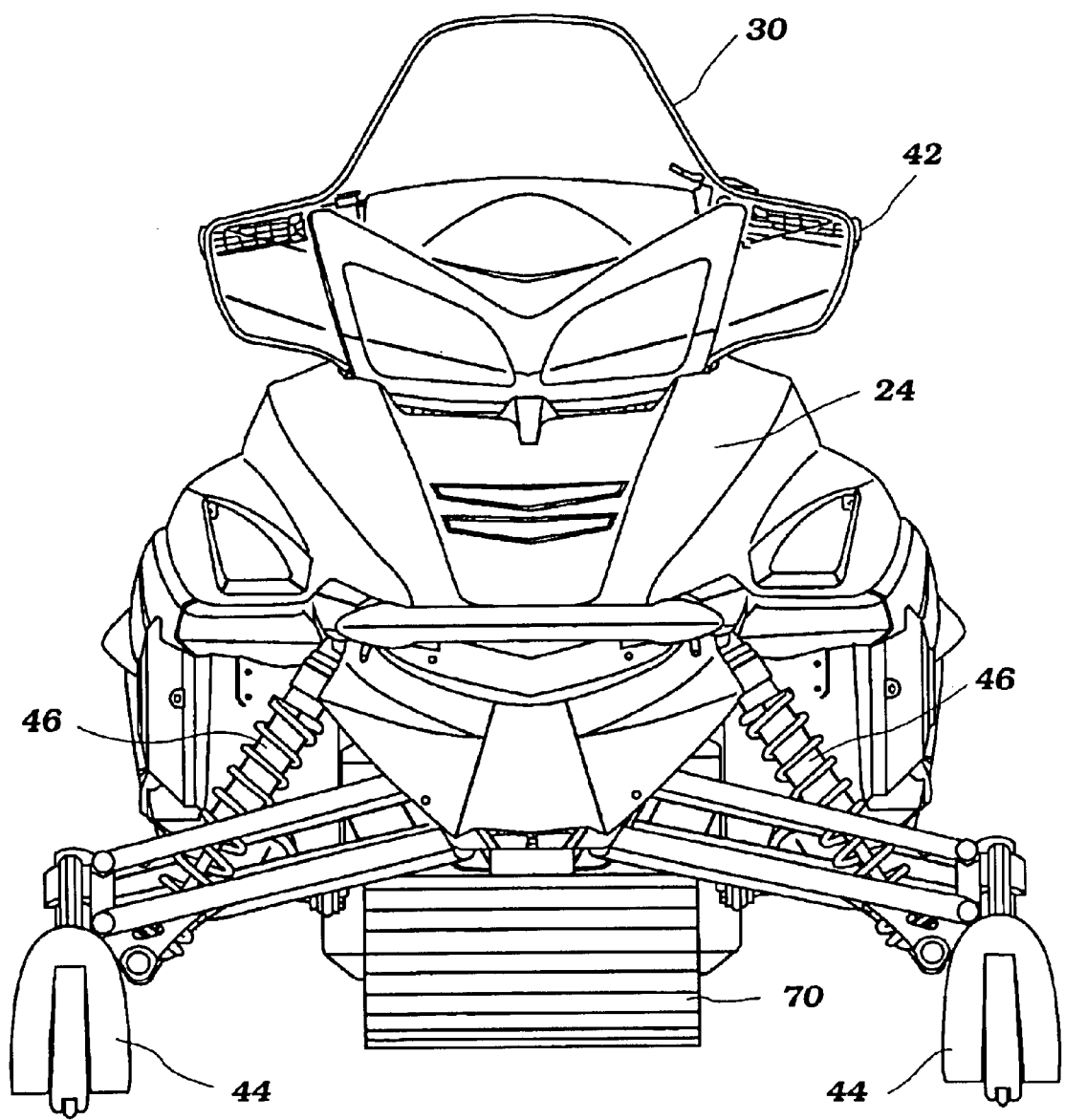
FIG. 3 is a front elevation view of the snowmobile of FIG. 1.

With reference now to FIGS. 1–3, a snowmobile featuring certain features, aspects and advantages of the present invention will be described. The snowmobile, indicated generally by the reference numeral 20, is an environment for which many features, aspects and advantages of the present invention have been specially adapted. Nevertheless, certain features, aspects and advantages of the present invention can be used with other vehicles.

Figure 4:
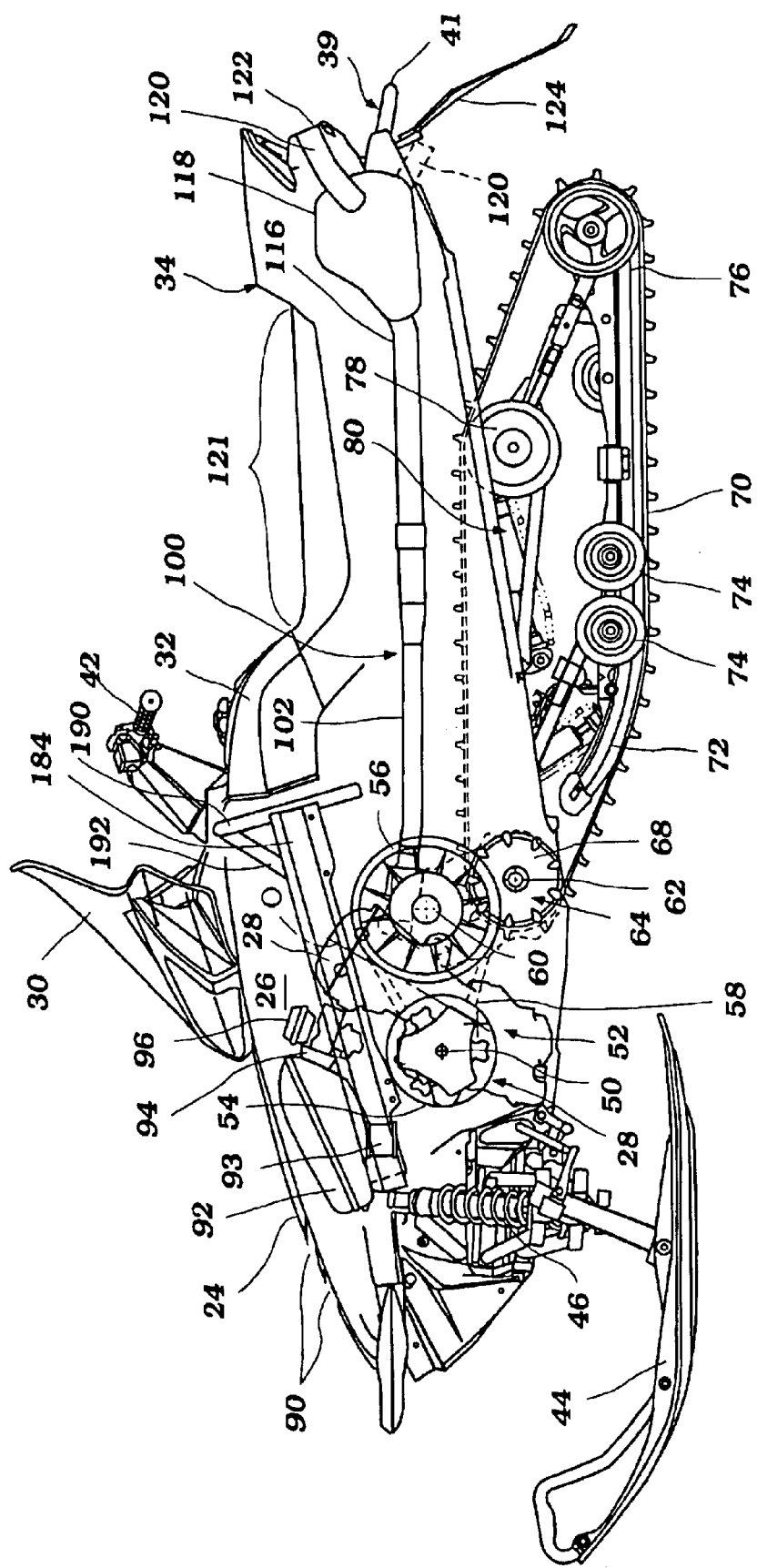
FIG. 4 is another side elevation view of the snowmobile of FIG. 1 with certain portions broken away and other internal portions shown in hidden line to better illustrate certain features, aspects and advantages of the present invention.
Figure 5:
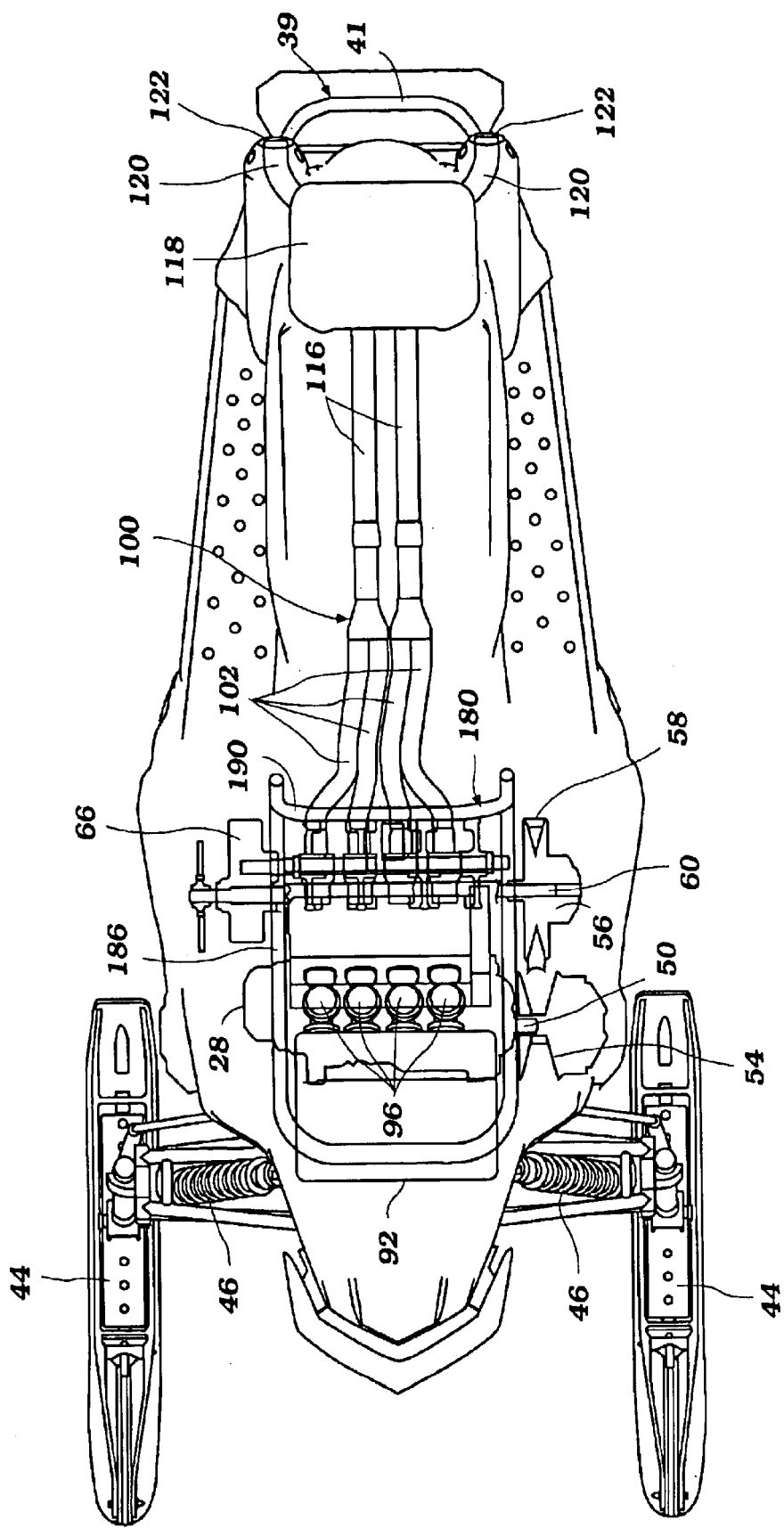
FIG. 5 is another top plan view of the snowmobile of FIG. 1 with certain portions broken away to better illustrate certain features, aspects and advantages of the present invention.

The snowmobile 20 generally comprises a frame assembly 22 (see FIG. 8) that carries a number of other components of the snowmobile 20. The frame assembly 22 will be described in greater detail below. A forward body cover 24 is disposed over a forward portion of the frame assembly 22. As illustrated in FIG. 4, the forward body cover 24 covers, in part, an engine compartment 26 in which an engine 28 is mounted. The engine 28 will be described in greater detail below.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to blend together for aesthetic reasons.

Figure 14:
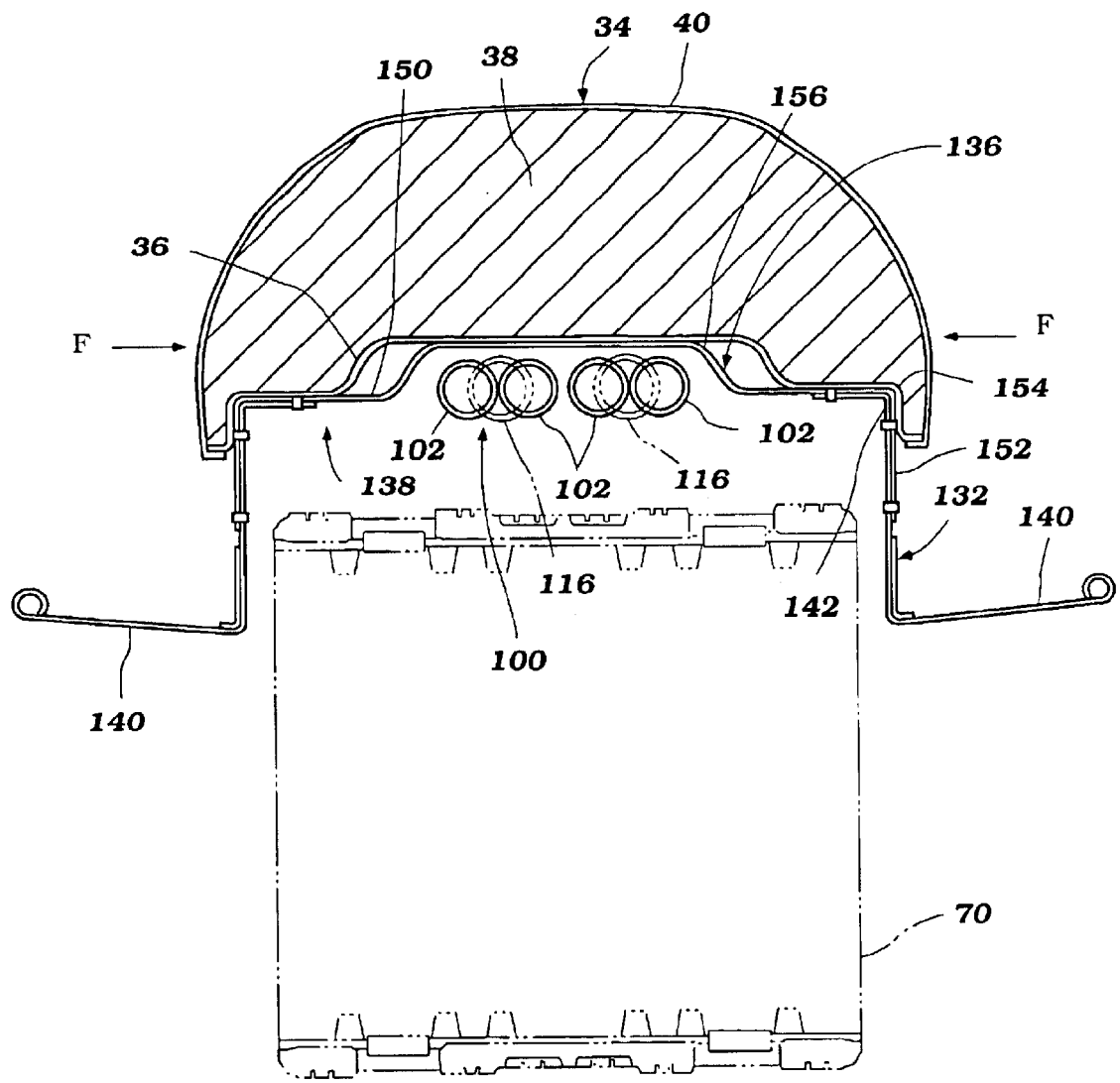
FIG. 14 is a section view of a portion of the snowmobile.
Figure 15:
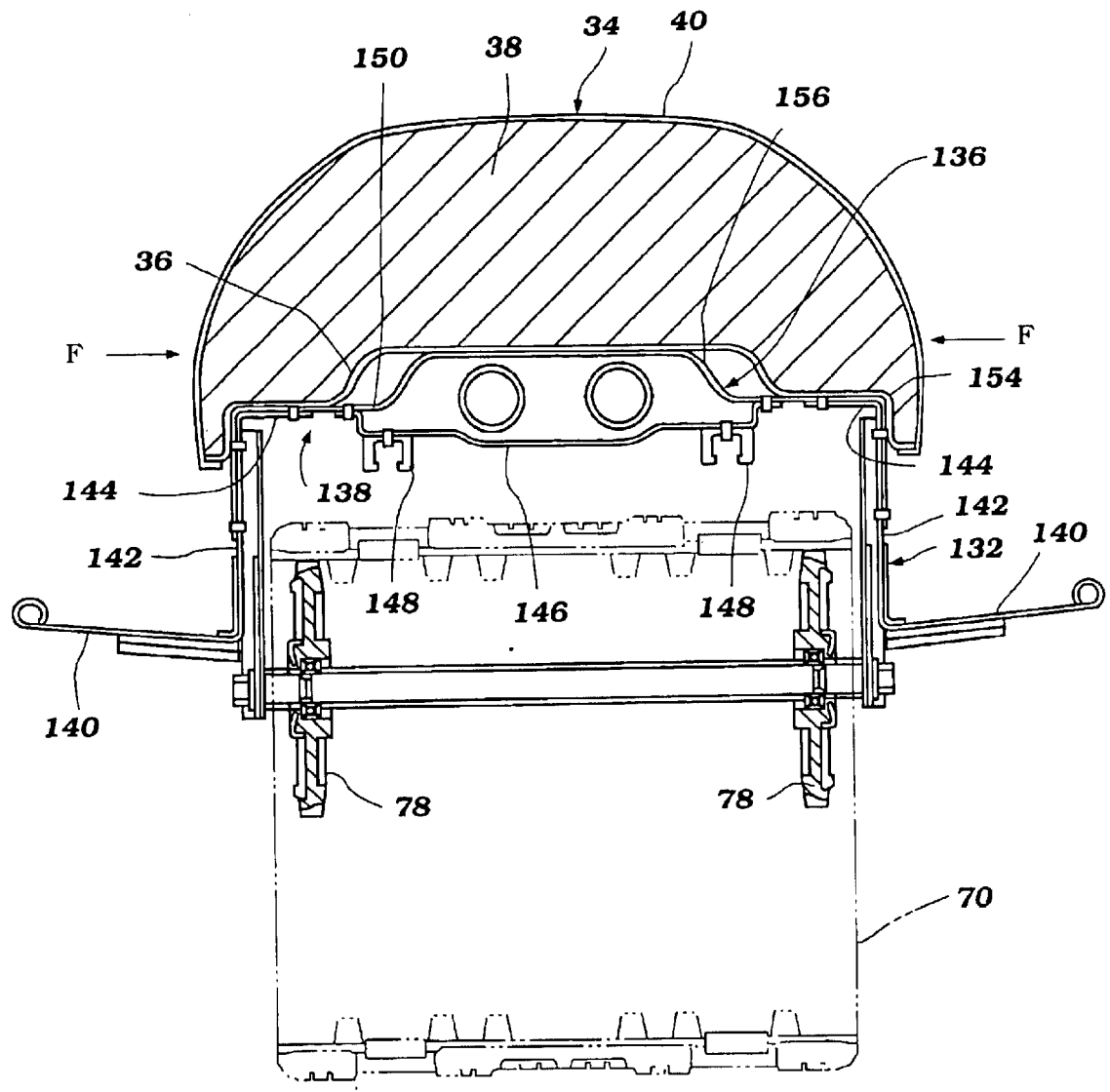
FIG. 15 is another section view of a portion of the snowmobile.

Rearward of the fuel tank 32, a seat 34 is mounted to the frame assembly 22. With reference to FIGS. 14 and 15, the seat 34 generally comprises a bottom plate 36 that is sized and configured to attach to the frame assembly 22 in any suitable manner. The bottom plate 36 generally supports the seat 34. A cushion member 38 is mounted to the bottom plate 36. The cushion member 38 can be formed of urethane or any suitable resilient or cushioning material. Overlying the cushion member 38 is a surface skin 40 in the illustrated arrangement. Preferably, the surface skin 40 is formed of a material that is substantially water impermeable. The seat 34 also preferably is designed to allow an operator to squeeze the seat 34 between the knees and is appropriately designed to absorb such forces, which are indicated in FIGS. 14 and 15 with arrows F. Rearward of the seat 34 is positioned a grab bar 39 that comprises a grabbing portion 41 that can be used to raise a rear portion of the snowmobile for turning and maneuvering when the snowmobile is not being ridden. While the illustrated grab bar 39 is generally U-shaped and is mounted in a generally horizontal manner, other forms of grab bars can be used. For instance, the grab bar 39 can be loops, semicircular, vertical or inclined in orientation. In short, any suitable grab bar construction can be used.

Forward of the seat 34 and the fuel tank 32 is a steering handle assembly 42. The steering handle assembly 42 can carry appropriate controls and can be suitably coupled to a pair of front skis 44. As the handle assembly 42 is turned, the skis 44 pivot clockwise and counterclockwise about an attachment location. As the skis 44 pivot, the direction of the snowmobile 20 can be altered. The skis 44 are mounted to the frame assembly 22 though a front suspension assembly 46. Any suitable front suspension assembly 46 can be used.

Figure 8:
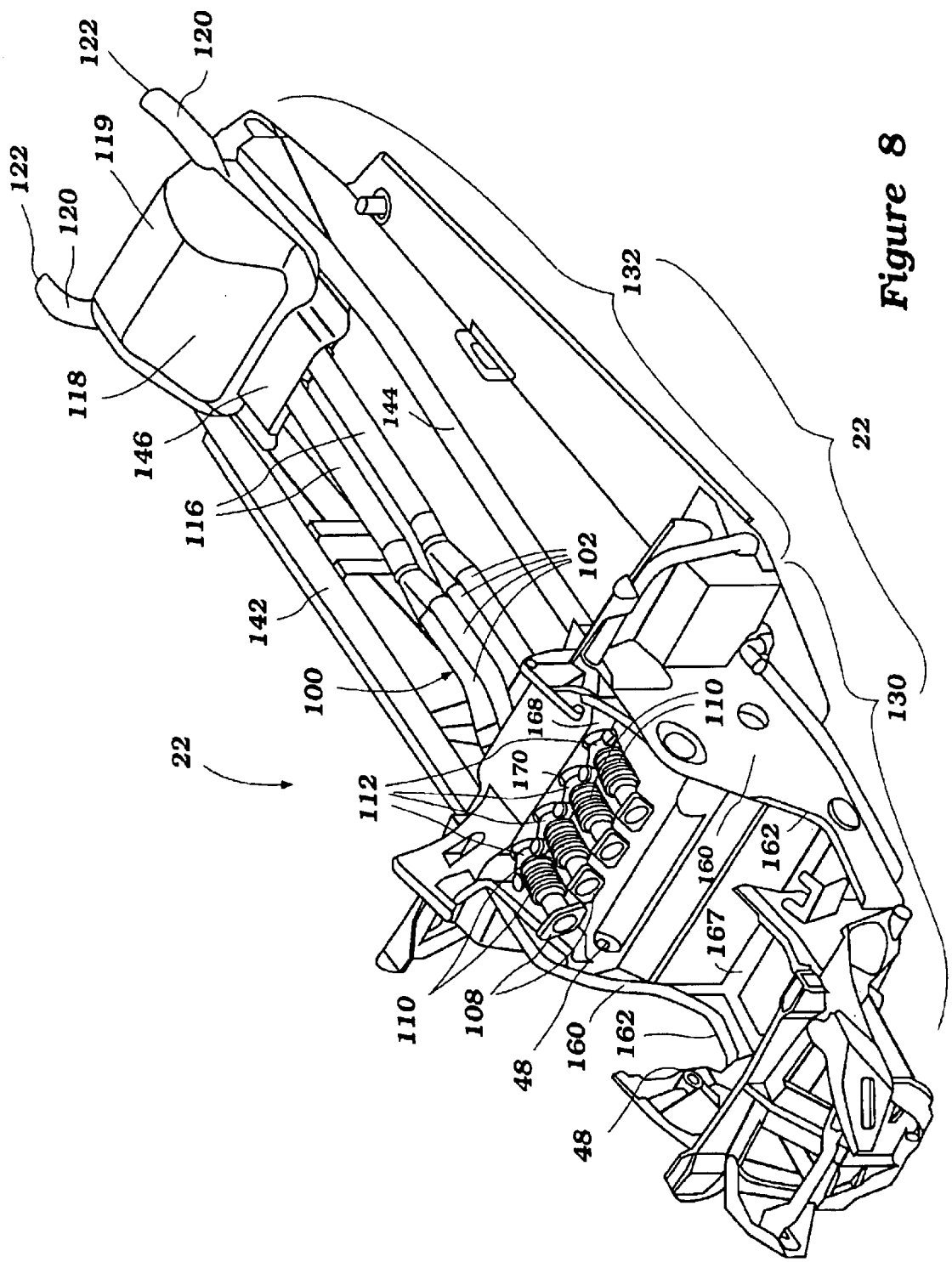
FIG. 8 is a perspective view of a frame assembly and certain components of an exhaust system of the snowmobile of FIG. 1.

With reference now to FIG. 4, the engine 28 is mounted to the frame assembly 22 in any suitable manner. As illustrated in FIG. 8, a set of resilient engine mounts 48 can be used to secure the engine to the frame assembly 22. The engine mounts 48 can be formed of rubber or a similar substance. By mounting the engine 28 with the resilient engine mounts 48, vibrations caused by operation of the engine 28 are reduced or eliminated before transmission through the frame assembly 22 to the operator.

The engine 28 in the illustrated arrangement is an inclined L-4 four-cycle engine that is mounted transversely within the engine compartment 26. In other words, the illustrated engine 28 comprises four cylinders that extend side-by-side across a width of the snowmobile 20. The cylinders each comprise a center axis O that is inclined relative to vertical. In some arrangements, engines having differing numbers of cylinders, different cylinder configurations (e.g., V, opposing, etc.), different orientations (e.g., vertical) and different operating principles (e.g., two-stroke, rotary, etc.) can be used.

The engine 28 also comprises an output shaft or crankshaft 50. The output shaft 50 drives a transmission, which is a continuously variable transmission 52 in the illustrated arrangement. Other transmissions also can be used. In the illustrated arrangement, the output shaft 50 rotates a drive pulley 54. The output shaft 50 and the drive pulley can be connected together through a clutch, a centrifugal clutch, a sprag clutch or can be directly connected together.

The drive pulley 54 powers a driven pulley 56 with a v-belt 58 in the illustrated arrangement. In some configurations, a drive chain can be used in place of the v-belt 58. Other arrangements also can be used. The driven pulley 56 is connected to and rotates about a transfer shaft 60. In the illustrated arrangement, the transfer shaft 60 carries a sprocket (not shown) at the end opposite to the driven pulley 56. The sprocket is connected to a further sprocket that is carried by a drive shaft 62. The sprockets are connected together by a chain in one arrangement and these three components are disposed within a chain box 66.

Figure 6:
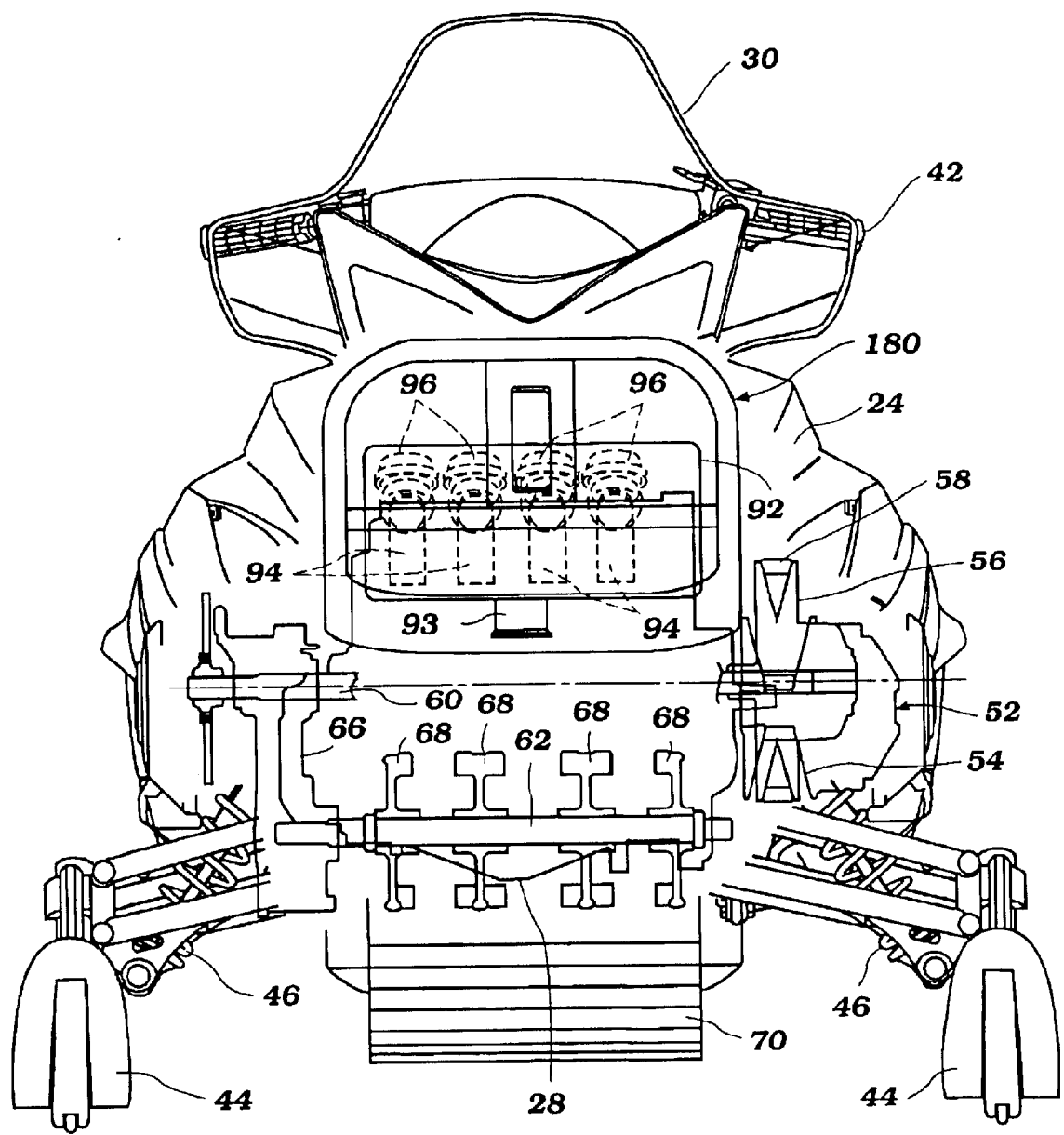
FIG. 6 is another front elevation view of the snowmobile of FIG. 1 with certain portions broken away and other internal portions shown in hidden line to better illustrate certain features, aspects and advantages of the present invention.

The drive shaft 62 powers a drive unit 64. The drive unit 64 generally comprises a plurality of drive wheels 68. With reference to FIG. 6, the illustrated drive unit 64 comprises four drive wheels 68. The drive wheels 68 provide a motive force to a drive belt or drive track 70, which is commonly used in the snowmobile industry.

With reference again to FIG. 4, the drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly with a rear suspension system 80. Any suitable rear suspension system 80 can be used and certain portions of the rear suspension system 80 have been schematically illustrated in the illustrated arrangement.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

With reference again to FIG. 4, air is drawn into the engine compartment 26 through suitable air passages. In some arrangements, the air is drawn through ventilation openings 90 formed in the body cover 24. The air drawn or forced into the engine compartment 26 circulates about the engine 28 and related drive components to help cool the engine 28 and the related drive components.

The air also is drawn into an air intake box 92. The air intake box 92 is disposed forward of the engine 28 in the illustrated arrangement. The air intake box 92 can be mounted to the frame assembly 22 in a manner that will be described. An inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28 rather than wrapping around the engine 28 and mating with a rearward-facing surface of the engine 28. The charge formers 96 preferably correspond to each cylinder. In some arrangements, a single charge former can be used upstream of a separation point for runners extending to individual cylinders. In addition, in the illustrated arrangement, the engine 28 is carbureted. In some arrangements, the charge formers 96 can be fuel injectors that are mounted for direct injection, indirect injection or port injection.

The air-fuel charge provided in this manner is combusted within the engine in a suitable manner. The combustion byproducts then are exhausted through a suitable exhaust system 100 via at least one exhaust port that extends in a rearward direction. In the illustrated arrangement, the exhaust system 100 extends directly rearward from the engine. In this manner, an exhaust runner, i.e. an exhaust conduit or second pipe 102 that extends rearward from the engine can be tuned to the engine for improved engine performance. Additionally, the length of each runner 102 can be lengthened prior to merging together with any other runners such that pulse effects on adjoining cylinders can be reduced.

Figure 13:
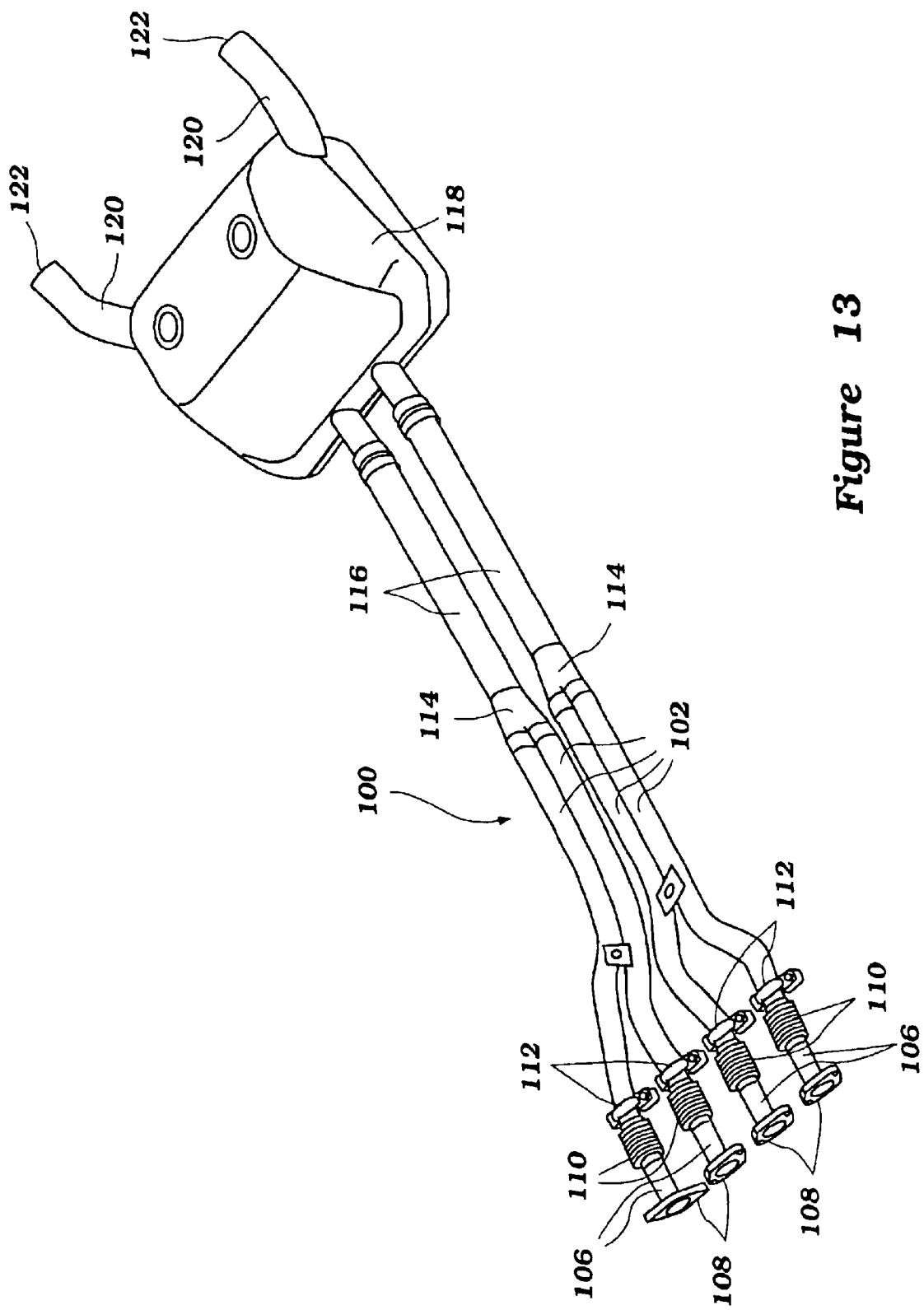
FIG. 13 is a perspective view of the components of the exhaust system that are illustrated together with the frame assembly in FIG. 8.

With reference now to FIG. 13, the exhaust system 100 will be described in greater detail. The exhaust system 100, as described above, preferably comprises the exhaust runners 102 that correspond to each cylinder and that extend generally rearward from the engine. Each exhaust runner 102 is coupled to an exhaust discharge pipe or first pipe 106 that is individually joined to the engine with a flange 108 in the illustrated arrangement. In some arrangements, a single manifold can be used.

In the illustrated arrangement, each of the discharge pipes 106 are coupled to the corresponding runner 102 with a flexible bellows member 110. Preferably, this coupling is disposed within the engine compartment. The flexible member 110 easily accommodates slight misalignments between the discharge pipes 106 and the runners 102. In addition, the runners 102 are secured in position relative to the frame assembly with a mounting bracket 112 in the illustrated arrangement. Such a mounting arrangement allows the flexible members 110 to isolate a large portion of the engine vibrations away from the exhaust runners 102. In other words, if the portion of the exhaust system 100 upstream of the flexible members 110 were connected with the frame assembly 22 then vibrations from the engine would likely be transmitted directly from the engine 28 to the frame assembly 22.

With continued reference to FIG. 13, at least two of the runners 102 join at a merge location 114 and the merged flow passes through a manifold or exhaust pipe 116. In the illustrated arrangement, two of the runners 102 join at the merge location 114 and flow into one manifold pipe 116. Thus, the illustrated arrangement features two manifold pipes 116. In some arrangements, more than two runners 102 can join into a single manifold pipe and one or more than two manifold pipes 116 can be used.

The manifold pipes 116 extend rearward to a silencer box 118. The silencer box provides an enlarged volume into which the exhaust can flow. Exhaust energy is dissipated within the silencer box 118 and the noise level of the exhaust can be decreased. In the illustrated arrangement, the silencer box 118 is disposed below a portion of the seat 34 that is rearward of a rider section 121 of the seat. Preferably, at least a portion of the silencer box 118 is covered with cover 119 made of a heat shield material to reduce the transfer of heat out of the silencer box 118 in an upward direction. Thus, positioning the seat 34 above the silencer box 118 does not result in a large amount of heat transfer into the seat 34.

A pair of exhaust pipes or tailpipes 120 extends rearward from the silencer box 118. In some arrangements, a single exhaust pipe or tailpipe 120 can extend from the silencer box 118. Other numbers of exhaust pipes also can be used. One end of the exhaust pipes 120 preferably define to an ultimate exhaust discharge 122 from the snowmobile 20 such that the exhaust gases are discharged into the atmosphere. As illustrated in FIG. 4, the exhaust pipes 120 can extend upwardly and rearwardly from the silencer box 118 while in another arrangement, shown in hidden lines, the exhaust pipes 120 can extend downward to a location forward of a protective flap 124. Preferably, the exhaust pipes 120 terminate at a location forward of the grab portion 41 of the grab bar 39

Figure 9:
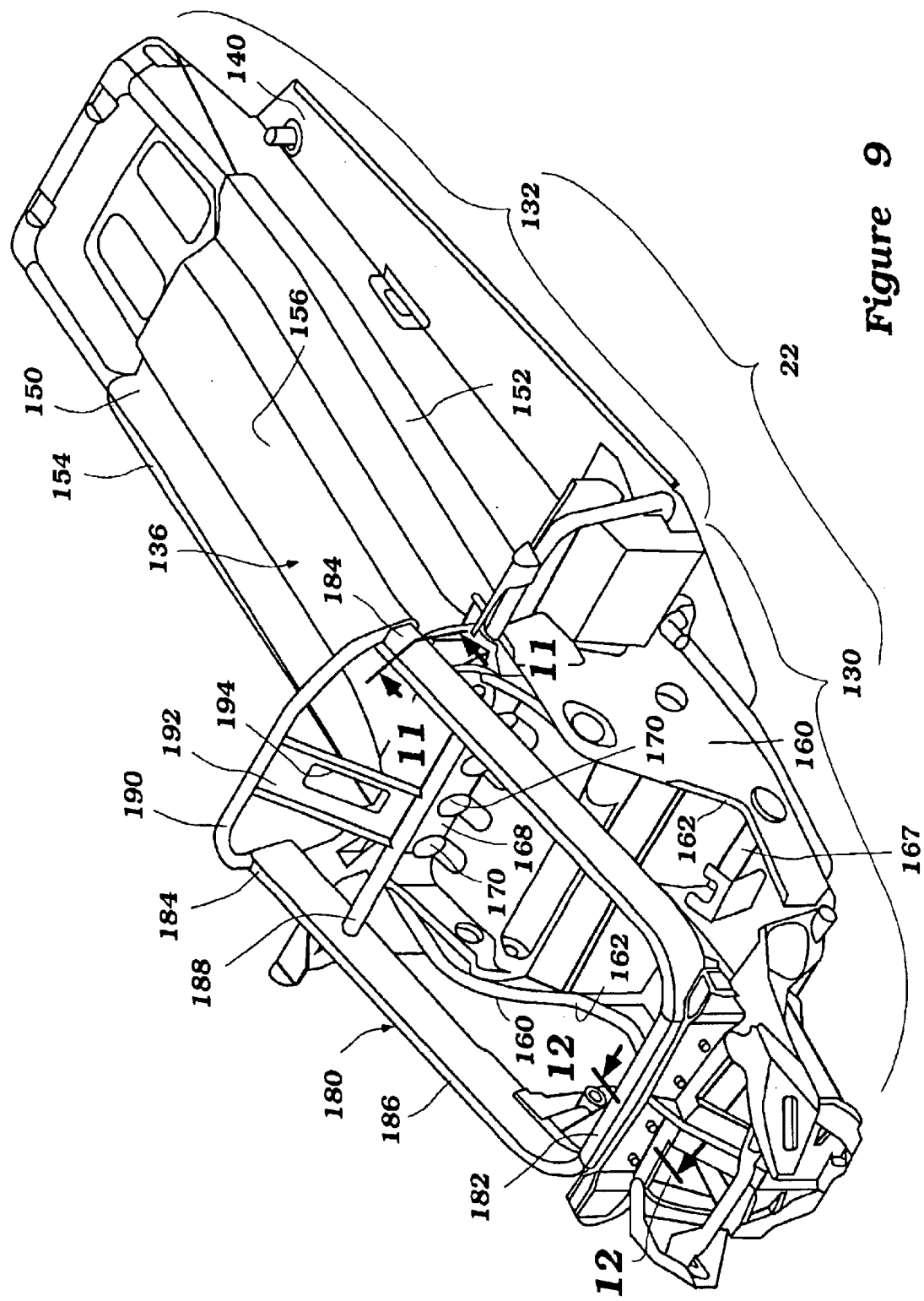
FIG. 9 is a perspective view similar to that of FIG. 8 with the components of the exhaust system removed.
Figure 10:
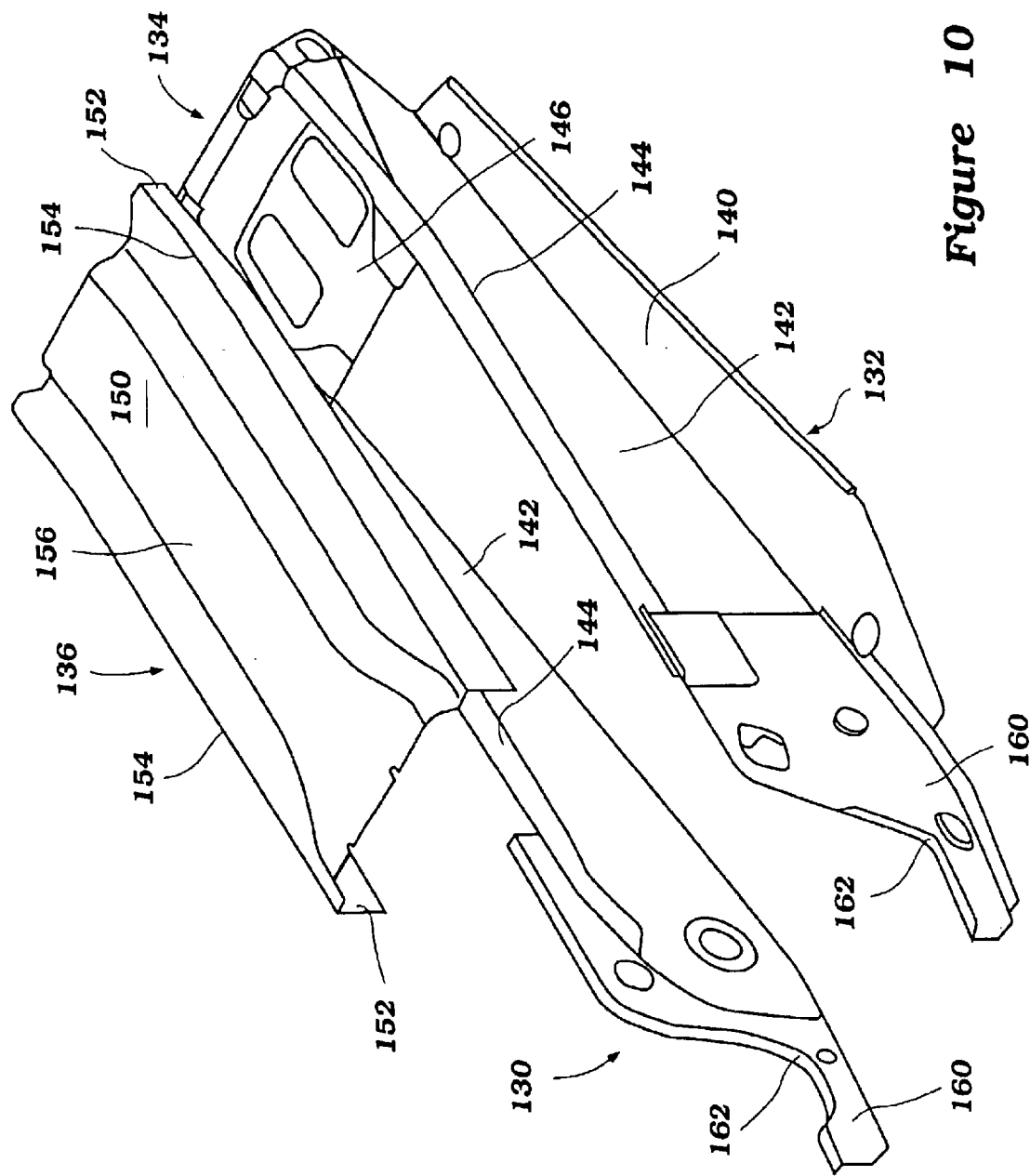
FIG. 10 is a perspective view of a portion of the frame assembly.

With reference now to FIGS. 8–12, the frame assembly 22 of the illustrated snowmobile 20 will be described in greater detail. The frame assembly 22 generally comprises a front portion 130 and a rear portion 132. With reference now to FIG. 10, the rear portion 132 generally is formed by two main components: an inverted generally U-shaped main body 134 and a deck 136. In one arrangement, the rear portion 132 resembles a hat shape in cross section.

With reference now to FIGS. 14 and 15, the main body 134 generally comprises an inverted generally U-shaped center portion 138 and a pair of outwardly extending foot steps 140. The foot steps 140 extend along a majority of the length of the snowmobile and are sized and configured to support the feet of an operator and any passengers. As is known, the operator and the passengers sit in a straddle fashion on the seat 34 such that the feet are positioned to either side of the seat 34.

The center portion 138 comprises a pair of upstanding side portions 142 that extend upward from the foot steps 140. The upstanding side portions 142 extend upward to a pair of inwardly extending top surfaces 144. In some arrangements, the top surfaces 144 can extend outward from the side portions 142; however, by extending the top surfaces 144 inward from the side portions 142, the strength of the frame assembly 122 can be increased.

Along a rear portion of the main body 134, a bridge plate 146 extends between the top surfaces 144. The silencer box 118 can be mounted to or proximate the bridge plate 146. Additionally, protective members 148 can be mounted to a lower surface of the bridge plate 146. The protective members 148 form a contact location when the drive belt 70 is overly displaced upwardly toward the frame. Thus, the belt 70 can slide along the protective members 148 without substantially impacting the frame assembly 22.

The deck 136 comprises a horizontal portion 150 and a pair of vertical portions 152 such that the deck 136 is generally U-shaped in configuration. With this configuration, the deck 136 can overlie an upper portion of the main body 134. Preferably, the deck 136 and the main body 134 have overlapping corner portions that reinforce the frame construction. In one arrangement, the deck 136 is secured to the upper portion of the main body 134 with fasteners such as clips, rivets, bolts, screws and the like. In some arrangements, the two components can be adhered or welded together.

Two edges 154 are defined by the intersection between the vertical portions 152 and the horizontal portions 150. The horizontal portion 150 further comprises an upwardly extending embossment or offset portion 156 that accommodates a portion of the exhaust system 100. Moreover, the bottom plate 36 of the seat 34 extends over the embossment 156 and has a recess that accommodates the embossment 156. This construction makes advantageous use of the thicker material used in the central region of the seat 34. At a rearward portion of the frame 132, the exhaust system 100 advantageously extends between the bridge plate 146 and the deck 136.

At least a portion of the exhaust system advantageously extends rearward generally below the deck 136 and above the track 70. In this manner, the movement of the track can sweep cool air over the exhaust system and any snow flying off of the track also can impinge upon the exhaust system. Thus, the illustrated arrangement helps to cool the exhaust gases. In the illustrated arrangement, the merge location of the pipes 102 is within this region defined between the deck 136 and the track 70. In particular, the merge location preferably is within the embossment 156 in one arrangement. Thus, a plurality of pipes 102 extend within the region defined between the deck 136 and the track 70.

With reference again to FIG. 10, a front side panel 160 is secured to each of the vertical portions 152 of the main body. The panel 160 can be secured in any suitable manner, such as, for example but without limitation, welding, fasteners, adhesives, etc. Each of the side panels 160 comprises a notch 162. The notch accommodates portions of the engine 28 and the related drive unit 64. In some arrangements, the panels 160 can be integrally formed with the main body 134; however, the illustrated arrangement advantageously increases the strength of the frame proximate the engine 28 due to the increased thickness of material.

Figure 7:
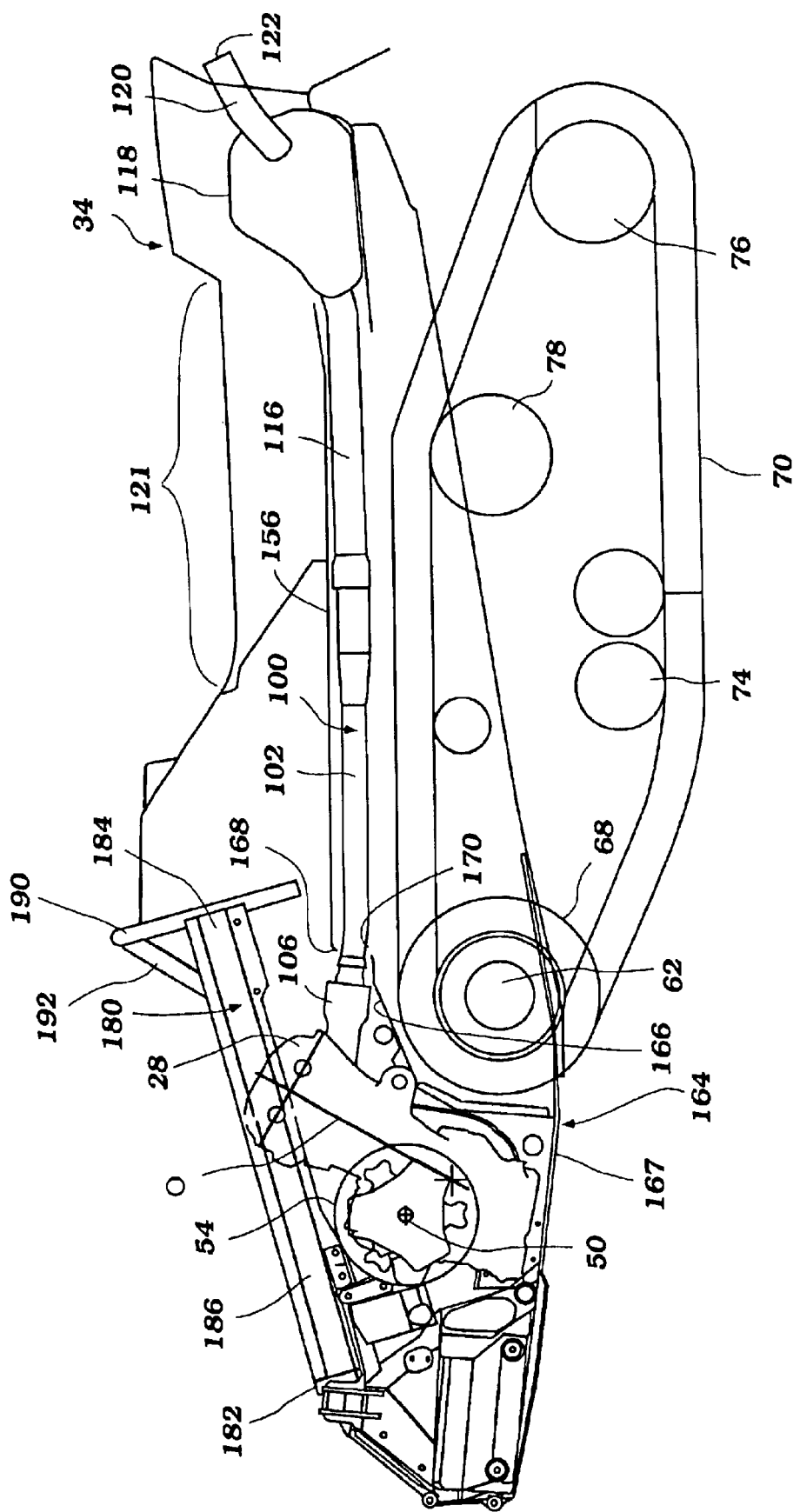
FIG. 7 is a simplified side elevation view of the snowmobile of FIG. 1.

With reference now to FIG. 7, an intermediate member 164 extends between the two panels 160 and between the two vertical portions 152 of the main body. The intermediate member 164 can be attached in any suitable manner. Generally speaking, an upper surface 166 of the intermediate member 164 defines a floor 167 for the engine compartment 26 and extends upward to also defined a rear wall 168 of the engine compartment 26. As such a plurality of openings 170 preferably are formed through the rear portion of the intermediate member 164 to allow the exhaust system 100 to extend through the intermediate member 164 and out of the engine compartment 26.

To further increase the rigidity of the frame assembly 22, a frame subassembly 180 is secured to the frame assembly 22. This subassembly 180 desirably is generally rectangular is shape and advantageously is disposed generally above the engine 28. More preferably, the subassembly 180 is tied to the balance of the frame assembly 22 proximate a front end 182 of the subassembly and a rear end 184 of the subassembly. Even more preferably, the subassembly 180 is attached to the front portion 130 of the frame assembly 22.

Thus, the engine 28 is positioned within a cavity defined between the side panels 160, above the floor 167, forward of a rear wall 170 and below the subassembly 180. Such a construction greatly increases the strength of the forward portion of the frame assembly 22 while the open construction advantageously reduces the amount of material involved and, therefore, decreases the weight. Moreover, through the use of the subassembly 180, the amount of material used in the side panels 160 can be reduced, which lowers the center of gravity, without substantially affecting the integrity of the frame assembly 22.

With reference now to FIG. 9, the illustrated subassembly 180 generally comprises a generally rectangular tubular member 186 that is bent into a U-shape. A bight of the U-shape is disposed forwardly in the illustrated arrangement. A bar 188 extends between the two legs of the U-shaped tubular member 186 at the end opposite the bight. The bar 188 reinforces the open end of the U-shape defined by the tubular member 186. A second bar 190 extends upward and between rear ends 184 of the tubular member 186 to further reinforce the subassembly 180 and to support the body cover 24. Furthermore, a support plate 192 extends upward and rearward from the bar 188 to the second bar 190. The support plate 192 comprises a slotted opening 194 and the plate and the opening are positioned within a region in which a steering shaft portion of the steering mechanism extends. In the illustrated arrangement, the bar 188 is disposed forward of at least a portion of the engine while the other bar 190 is disposed rearward of at least a portion of the engine. In fact, the bar 190 advantageously is disposed rearward of the entire engine in one arrangement to further enhance the structural integrity of the construction.

Figure 11:
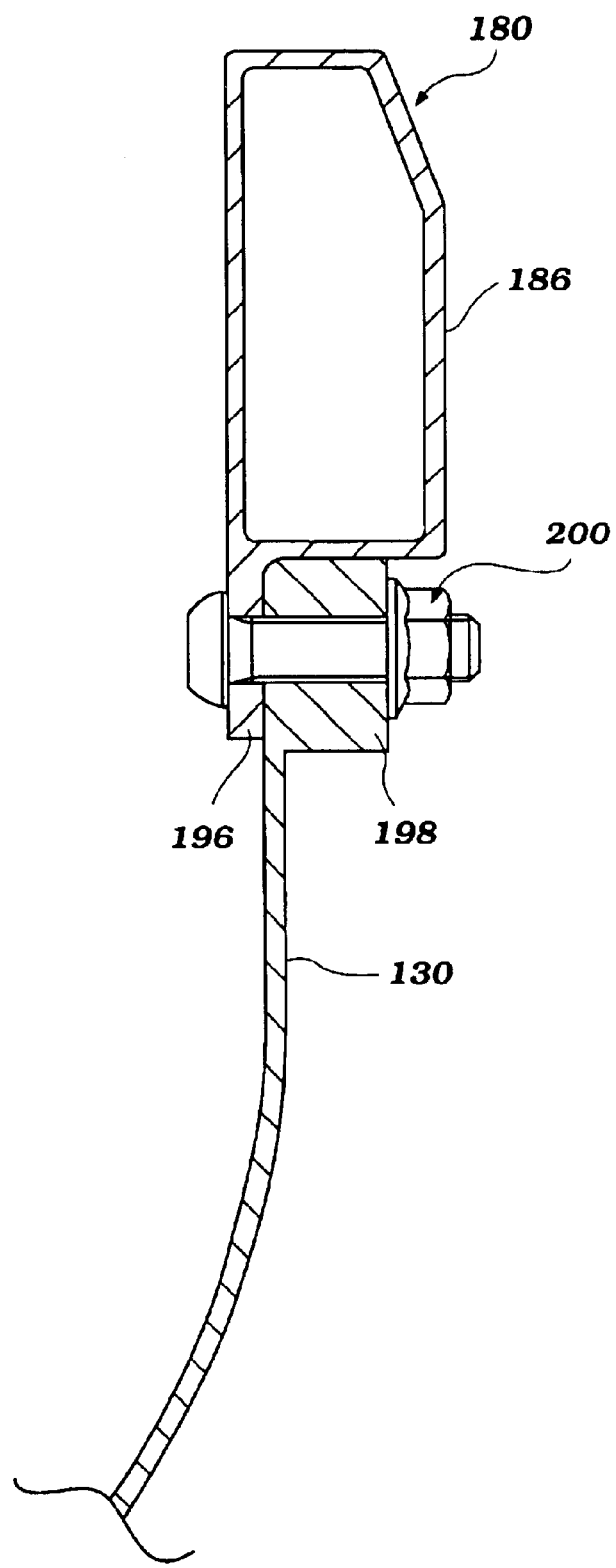
FIG. 11 is a section view of a portion of the frame assembly taken along the line 11—11 in FIG. 9.

With reference now to FIG. 11, a rear portion of the tubular member 186 is secured to a rearward part of the front portion 130 of the frame assembly 22 in at least two locations. In particular, an ear 196 is secured to the tubular member 186 and a boss 198 is formed on the front portion 130 of the frame assembly 22. A nut and bolt assembly 200 secures the ear 196 and the boss 198 together in the illustrated arrangement; however, any suitable arrangement can be used to secure the two components together.

Figure 12:
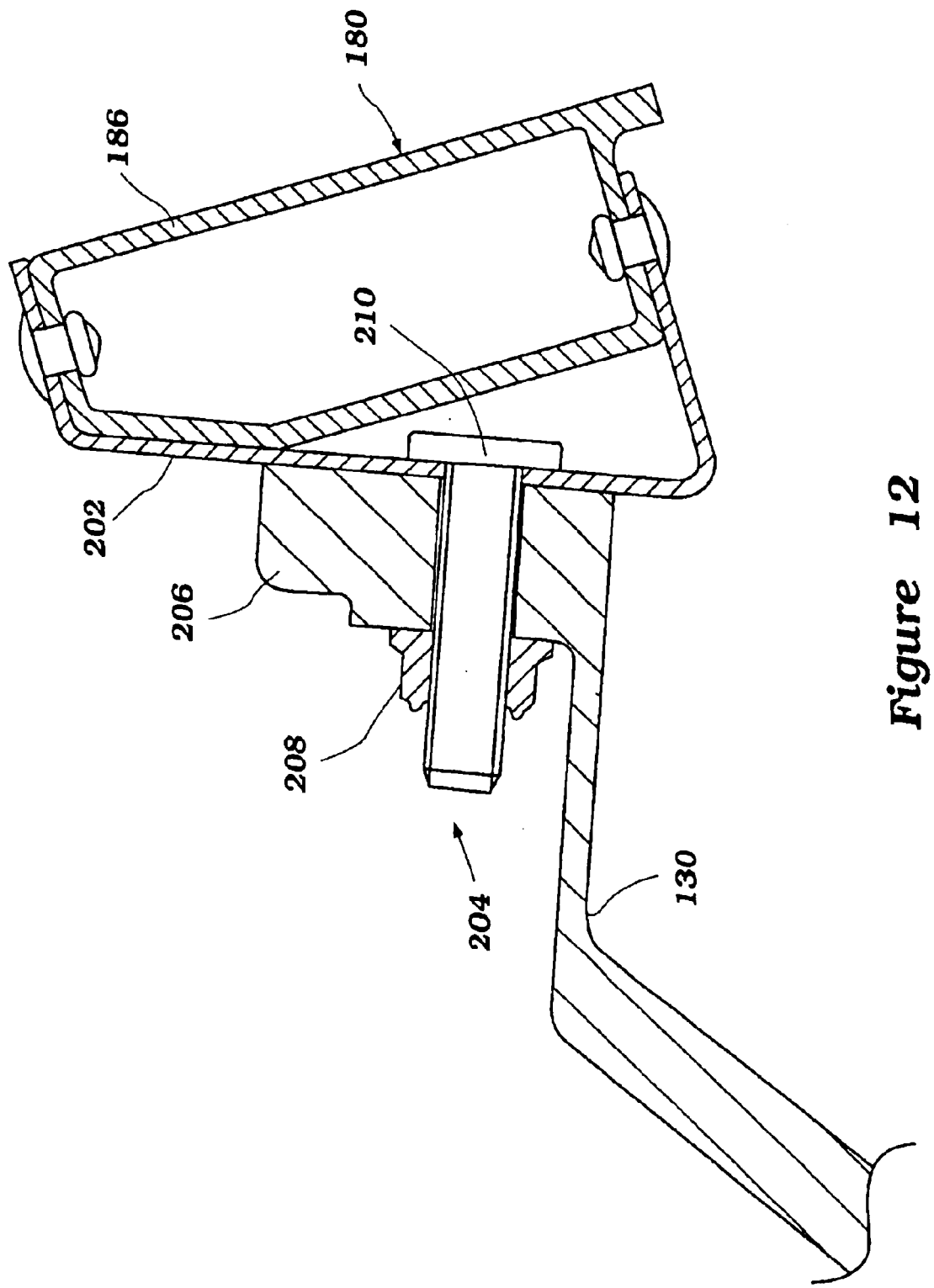
FIG. 12 is a section view of another portion of the frame assembly taken along the line 12—12 in FIG. 9.

With reference now to FIG. 12, a forward portion of the tubular member 186 is secured to a forward part of the front portion 130 of the frame assembly 22. In the illustrated arrangement, a cover plate 202 is secured to the tubular member 186 with rivets. In some constructions, the cover plate 202 can be secured to the tubular member 186 in other manners and, in yet other constructions, the cover plate 202 can be omitted. A fastening arrangement 204 extends through the cover plate 202 and a boss 206 formed along a length of the front portion 130 of the frame assembly 22. In the illustrated arrangement, the fastening arrangement 204 comprises a nut 208 and a bolt 210 but other suitable fastening arrangements can be used.

Desirably, the subassembly 180 is removably attached to the front portion 130 of the frame assembly 22 to enable the subassembly 180 to be removed for access to the engine 28 during maintenance. In some arrangements, the subassembly is mounted in a manner that allows access to the mounting fasteners with the body cover 24 attached to the snowmobile and the subassembly is secured to the body cover 24 such that the subassembly and the body cover can be removed together once the subassembly is separated from the balance of the frame assembly.

In addition, the illustrated construction results in the subassembly 130 generally defining a transverse plane that slopes upward from front to rear. At its rear, the two bars 188, 190 extend at locations on either side of an attachment location to the frame assembly 22.

It should be noted that the air box 92 is mounted to the subassembly 130 in the illustrated arrangement. In one arrangement, the air box 92 is positioned above the subassembly 130 and takes advantage of space available between the subassembly 130 and the body cover 24. In some arrangements, the air box 92 is removably secured to the subassembly 130 with suitable fasteners but other mounting arrangements also can be used. Moreover, the air box 92 comprises the air inlet 93, which is disposed within a region defined by the subassembly 130 and forward of the engine in the illustrated arrangement. Such a location advantageously shields the inlet 93 and protects that portion of the air box 92.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A snowmobile comprising:
a frame assembly comprising an inverted generally U-shaped portion that extends at least partially beneath a seat of the snowmobile;
an engine mounted to said frame assembly;
a drive belt powered by said engine and disposed at least partially within said inverted generally U-shaped portion;
an exhaust system connected to said engine and extending rearward of said engine in a region defined directly between a bight of said inverted generally U-shaped portion and a generally laterally extending surface of said drive belt.

2. The snowmobile of claim 1, wherein said engine comprises a transversely extending crankshaft and at least one cylinder that is inclined in a rearward direction.

3. The snowmobile of claim 2, wherein said engine further comprises at least one exhaust discharge pipe that extends to a rearward direction.

4. The snowmobile of claim 1, wherein said frame assembly comprises a front portion and a rear portion, said front portion at least partially defining an engine compartment and wherein said exhaust system comprises first pipe and a second pipe, said first pipe and said second pipe being connected together in said engine compartment.

5. The snowmobile of claim 4, wherein said first pipe and said second pipe are connected with a flexible coupling member.

6. The snowmobile of claim 1, wherein said engine comprises at least two cylinders, said exhaust system comprises at least two conduits that are in communication with said at least two cylinders, and a majority of said at least two conduits are disposed within said region defined between said bight of said inverted generally U-shaped portion and said drive belt.

7. The snowmobile of claim 6, wherein an area between said two conduits of said exhaust system and said drive belt is substantially unobstructed.

8. The snowmobile of claim 1, wherein said seat comprising a sitting portion that is configured to accommodate a rider and said exhaust system comprising a silencer box, and said silencer box comprising a rear portion that is disposed rearward of said sitting portion.

9. The snowmobile of claim 8 further comprising a tailpipe extending rearward of said silencer box and terminating forward of a grab bar that is connected to said frame assembly.

10. The snowmobile of claim 1, wherein said inverted generally U-shaped portion comprises a deck member and a pair of side members, said deck member and said pair of side members having a pair of overlapping corners.

11. A snowmobile comprising:
a frame assembly comprising an inverted generally U-shaped portion that extends at least partially beneath a seat of the snowmobile;
an engine mounted to said frame assembly;
a drive belt powered by said engine and disposed at least partially within said inverted generally U-shaped portion;
an exhaust system connected to said engine and extending rearward of said engine in a region defined between a bight of said inverted generally U-shaped portion and a generally laterally extending surface of said drive belt, wherein said generally U-shaped portion comprises a deck and said deck comprises an upwardly embossed portion that extends in a longitudinal direction and wherein said exhaust system comprises an exhaust conduit that comprises at least a portion that extends rearward of said engine within said embossed portion.

12. The snowmobile of claim 11, wherein said seat is disposed over said embossed portion.

13. The snowmobile of claim 12, wherein said seat comprises a bottom plate and a resilient cushion member that is mounted to said bottom plate and wherein said bottom plate spans a width of said embossed portion that is transverse to said longitudinal direction.

14. The snowmobile of claim 12, wherein said seat comprises a bottom plate and a resilient cushion member that is mounted to said bottom plate and wherein said bottom plate spans a width of said embossed portion that is transverse to said longitudinal direction.

15. A snowmobile comprising:
a frame assembly comprising an inverted generally U-shaped portion that extends at least partially beneath a seat of the snowmobile;
an engine mounted to said frame assembly;
a drive belt powered by said engine and disposed at least partially within said inverted generally U-shaped portion;
an exhaust system connected to said engine and extending rearward of said engine in a region defined between a bight of said inverted generally U-shaped portion and a generally laterally extending surface of said drive belt, wherein said bight of said inverted generally U-shaped portion comprises an upwardly embossed generally horizontal wall portion that defines a recess below said wall portion and said exhaust system comprises a first exhaust conduit extending rearward from a first cylinder and a second exhaust conduit extending rearward from a second cylinder, said first and second exhaust conduits merging together into a single pipe within said recess.

16. The snowmobile of claim 15, wherein said single pipe also extends rearward to a silencer box.

17. A snowmobile comprising a frame assembly, said frame assembly comprising a front portion and a rear portion that are joined together, said rear portion comprising three walls that combine to form an inverted U-shaped member that extends under at least a portion of a seat of the snowmobile, said front portion defining an engine compartment, an engine disposed within said engine compartment, said engine powering a drive track, said drive track extending below at least a portion of said inverted U-shaped member, an exhaust system coupled to said engine and defining a discharge path for exhaust gases generated in said engine, and said exhaust system comprising an exhaust conduit that extends directly between an inner surface of said inverted U-shaped member and said drive track, said exhaust conduit extending through a region defined generally above said drive track.

18. The snowmobile of claim 17, wherein said exhaust system is coupled to said engine with an flexible member that is disposed within said engine compartment.

19. The snowmobile of claim 18, wherein said engine is transversely disposed.

20. The snowmobile of claim 19, wherein said engine comprises a combustion chamber and an exhaust port that extends from said combustion chamber in a rearward direction.

21. The snowmobile of claim 20, wherein said engine comprises an inline four cylinder engine.

22. The snowmobile of claim 17 further comprising a silencer box that is in communication with said exhaust conduit, at least a portion of said silencer box extending beneath a portion of said seat.

23. The snowmobile of claim 22, wherein said silencer box comprises a rear portion and said seat comprises a sitting portion that accommodates a rider, said rear portion of said silencer box being disposed rearward of said sitting portion.

24. The snowmobile of claim 22 further comprising a grab bar that extends rearward of said seat and at least one exhaust discharge pipe that extends from said silencer box, said exhaust discharge pipe being disposed completely forward of a grabbing portion of said grab bar.

25. The snowmobile of claim 24, wherein said discharge pipe extends upwardly and rearwardly from said silencer box.

26. The snowmobile of claim 24, wherein said discharge pipe extends downwardly from said silencer box.

27. The snowmobile of claim 26, wherein said snowmobile comprises a flap that hangs downward generally rearward of said drive track and said discharge pipe terminates forward of said flap.

28. A snowmobile comprising a frame assembly, said frame assembly comprising a front portion and a rear portion that are joined together, said rear portion comprising three walls that combine to form an inverted U-shaped member that extends under at least a portion of a seat of the snowmobile, said front portion defining an engine compartment, an engine disposed within said engine compartment, said engine powering a drive track, said drive track extending below at least a portion of said inverted U-shaped member, an exhaust system coupled to said engine and defining a discharge path for exhaust gases generated in said engine, and said exhaust system comprising an exhaust conduit that extends between an inner surface of said inverted U-shaped member and said drive track, said exhaust conduit extending through a region defined generally above said drive track, wherein said inner surface defines a generally horizontal plane and said inner surface also comprises an upwardly offset portion and wherein said exhaust conduit extends within said offset portion.

29. The snowmobile of claim 28, wherein said exhaust system comprises at least two conduits that merge together at a merge location positioned within said offset portion.

30. The snowmobile of claim 29, wherein said exhaust system further comprises an exhaust pipe that extends rearward of said merge location within said offset portion.

31. The snowmobile of claim 29, said seat is disposed over said offset portion.

32. The snowmobile of claim 31, wherein said seat comprises a bottom plate member that spans a width of said offset portion.

33. A snowmobile comprising:
a frame assembly comprising an inverted generally U-shaped portion, said generally U-shaped portion comprising a deck, said deck comprising an upwardly embossed portion that extends in a longitudinal direction;
an engine mounted to said frame assembly;
a drive belt powered by said engine and disposed at least partially within said inverted generally U-shaped portion;
an exhaust system connected to said engine and comprising an exhaust conduit, at least a portion of said exhaust conduit extending rearward of said engine in a region within said embossed portion at a location defined between a bight of said inverted generally U-shaped portion and said drive belt.

34. The snowmobile of claim 33 further comprising a seat that is disposed over said embossed portion.

35. A snowmobile comprising:
a frame assembly comprising an inverted generally U-shaped portion;
an engine mounted to said frame assembly;
a drive belt powered by said engine and disposed at least partially within said inverted generally U-shaped portion;
an exhaust system connected to said engine and extending rearward of said engine in a region defined between a bight of said inverted generally U-shaped portion and said drive belt, said bight of said inverted generally U-shaped portion comprising an upwardly embossed generally horizontal wall portion that defines a recess below said wall portion and said exhaust system comprises a first exhaust conduit extending rearward from a first cylinder and a second exhaust conduit extending rearward from a second cylinder, said first and second exhaust conduits merging together into a single pipe within said recess.

36. The snowmobile of claim 35, wherein said single pipe also extends rearward to a silencer box.

37. A snowmobile comprising a frame assembly, said frame assembly comprising a front portion and a rear portion that are joined together, said rear portion comprising three walls that combine to form an inverted U-shaped member, said front portion defining an engine compartment, an engine disposed within said engine compartment, said engine powering a drive track, said drive track extending below at least a portion of said inverted U-shaped member, an exhaust system coupled to said engine and defining a discharge path for exhaust gases generated in said engine, and said exhaust system comprising an exhaust conduit that extends between an inner surface of said inverted U-shaped member and said drive track, said inner surface defining a generally horizontal plane and said inner surface also comprising an upwardly offset portion and said exhaust conduit extending within said offset portion.

38. The snowmobile of claim 37, wherein said exhaust system comprises at least two conduits that merge together at a merge location positioned within said offset portion.

39. The snowmobile of claim 38, wherein said exhaust system further comprises an exhaust pipe that extends rearward of said merge location within said offset portion.

40. The snowmobile of claim 38 further comprising a seat that is disposed over said offset portion.

41. The snowmobile of claim 40, wherein said seat comprises a bottom plate member that spans a width of said offset portion.

* * * * *

UNITED STATES PATENT AND TRADEMARK OFFICE
CERTIFICATE OF CORRECTION

PATENT NO. : 6,802,383 B2  Page 1 of 1
DATED : October 12, 2004
INVENTOR(S) : Shinichi Nishijima It is certified that error appears in the above-identified patent and that said Letters Patent is hereby corrected as shown below:

<u>Column 11,</u>
Line 51, before "said" insert -- wherein --.

Signed and Sealed this

Eleventh Day of April, 2006

JON W. DUDAS
*Director of the United States Patent and Trademark Office*